United States Patent [19]
Moller

[11] Patent Number: 5,172,489
[45] Date of Patent: Dec. 22, 1992

[54] PLASTIC RESIN DRYING APPARATUS AND METHOD

[75] Inventor: Richard W. Moller, Fenton, Mich.

[73] Assignee: Hydreclaim Corporation, Fenton, Mich.

[21] Appl. No.: 693,717

[22] Filed: Apr. 30, 1991

[51] Int. Cl.⁵ .............................. F26B 3/00
[52] U.S. Cl. ........................... 34/32; 34/72; 34/80
[58] Field of Search .............. 34/80, 81, 26, 27, 32, 34/72, 79; 55/179, 180, 387

[56] References Cited

U.S. PATENT DOCUMENTS 4,918,837 4/1990 Graff ....................... 34/80
4,974,337 12/1990 Tavakoli et al. ................ 34/80 X Primary Examiner—Henry A. Bennet
Attorney, Agent, or Firm—Learman & McCulloch

[57] ABSTRACT

Apparatus for drying plastic resin particles comprises a container, such as a hopper, for holding the resin particles to be dried and a first closed airflow loop communicating with the container for passing a heated airstream through the container to heat the particles and remove moisture therefrom. The heated airstream becomes moist and is returned to a plenum. A second closed airflow loop communicates with the plenum for receiving a portion of the moist return air under the control of an adjustable by-pass valve in the plenum. The second airflow loop includes a desiccant dryer communicating with the first airflow loop so that air dried by the desiccant dryer is mixed with moist air from the plenum for heating and return to the container.

20 Claims, 1 Drawing Sheet

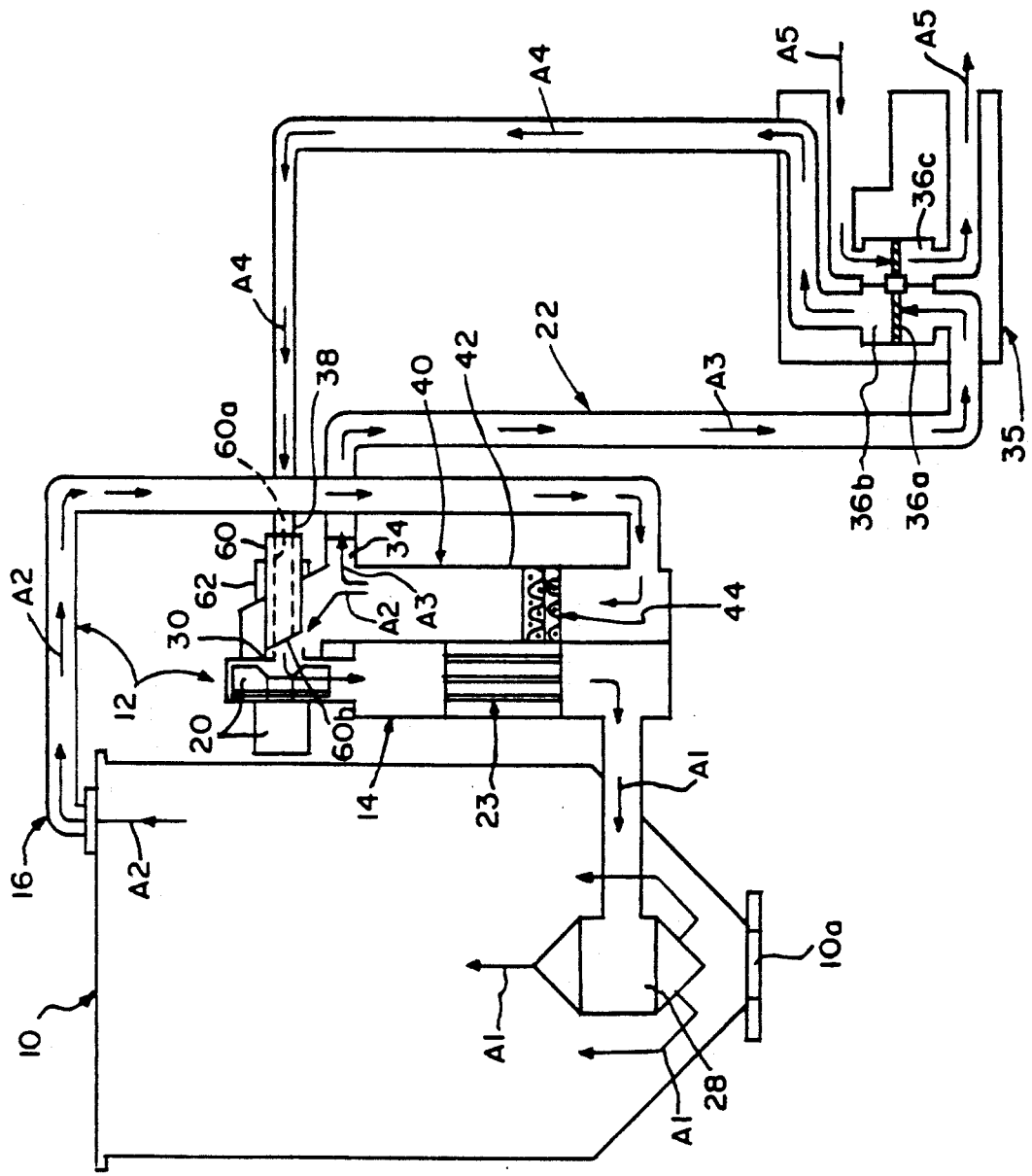

PLASTIC RESIN DRYING APPARATUS AND METHOD

FIELD OF THE INVENTION

The present invention relates to apparatus and methods for drying moisture-bearing particles such as hygroscopic plastic resin particles.

BACKGROUND OF THE INVENTION

Prior to being fed to an extruder, hygroscopic plastic resin granules or pellets (particles) typically are dried to remove deleterious moisture. Heretofore, drying of the plastic resin particles has been accomplished by either an open loop, hot air drying system or a closed loop, desiccant drying system.

The open loop, hot air drying system includes a conical drying hopper in which the plastic resin particles to be dried are accommodated and a heater compartment/blower unit for supplying heated air to the hopper for dispersal over the resin particles by an air dispersal mechanism in the hopper. Typically, ambient air is drawn into the blower, heated to the required drying temperature (usually 160° to 300° F.) in the heater compartment, and discharged into a lower region of the hopper where it is dispersed to flow upwardly around the resin particles. The particles are thereby heated and release moisture which is drawn from the top of the hopper for discharge into the surrounding atmosphere.

The open loop, hot air drying system has inherent limitations as a result of the use of the heated ambient air to effect the drying action. In particular, the heated air itself may not be sufficiently dry to remove enough moisture from the plastic resin particles to enable extrusion of acceptable end products, particularly under humid ambient conditions that are prevalent in certain periods of the year (e.g., the summer months) and/or in certain geographic regions. This limitation is especially acute with respect to the extrusion of moisture-sensitive plastic resins, such as nylons and ABS.

The closed loop, desiccant drying system currently is the most widely used for drying plastic resin particles in preparation for extrusion. This system employs a conical drying hopper containing the resin particles to be dried and an in-line desiccant dryer. In this system, moisture-laden air from the top of the hopper is recycled in to back to the desiccant dryer to remove the moisture. The dried air is then passed through blower and heater compartments and returned to the lower region of the hopper. Closed loop, desiccant drying systems typically operate using −40° F. to dewpoint airflow through the plastic resin particles.

The closed loop, desiccant drying system is advantageous in that it is virtually unaffected by the moisture conditions of the ambient air. However, the desiccant dryer must be sized for the air flow of the drying hopper to achieve proper operation thereof and the air flow through the desiccant material must be maintained at an appropriate velocity over the desiccant material for proper moisture removal. The typical rule of thumb for plastic resin particulate drying requires an airflow of one cubic foot per minute per pound of plastic resin particles to be dried per hour (1 cfm/lb/hr). Unfortunately, this rule dictates use of a large, expensive desiccant dryer unit that is sized for the air flow requirements, rather than for the moisture removal capacity of the desiccant material. Thus, the closed loop, desiccant drying system has high equipment costs associated therewith.

An object of the present invention is to provide an improved closed loop apparatus and method for drying moisture-bearing particles wherein a first airflow loop is used for heating and removing moisture from the particles in a container, a second desiccant drying loop is used for removing moisture from a portion of the moisture-laden return airflow, and an airflow valve is provided for adjusting as needed the relative proportions of moisture-laden return airflow and dried return airflow in the heated airflow supplied to the container for effective drying of the resin particles.

Another object of the invention is to provide an improved closed loop apparatus and method for drying moisture-bearing particles wherein, by virtue of use of the dual closed loops in conjunction with the airflow valve, the desiccant dryer can be sized to the moisture removal capacity of the desiccant material so as to permit use of a smaller desiccant dryer unit and thereby provide a significant reduction in equipment cost.

SUMMARY OF THE INVENTION

The present invention contemplates a closed loop apparatus and method for drying moisture-bearing particles wherein the particles are held in a container, such as a hopper. A first airflow loop communicates with the container for passing heated air through the container to heat the particles and remove moisture therefrom. Air which passes through such particles becomes moisture laden. A plenum communicates with the first airflow loop for receiving the moist air from the container. A second airflow loop communicates with the plenum for receiving at least a portion of the return air. The second airflow loop includes a desiccant dryer in communication with the first airflow loop to dry the portion of the return air received from the plenum and supply the dried air to the first airflow loop for mixing with the moist return air from the plenum.

Valve means is disposed in the plenum for controlling the amount of moist return air that is returned to the first airflow loop from the plenum and the amount that is returned to the first airflow loop via the second airflow loop after drying by the desiccant dryer. Typically, the valve means is adjusted to provide airflow through the second airflow loop that ranges from 25% to 75% of the total heated airflow through the container. The airflow passed through the container thus comprises a mixture of moisture-laden return air from the plenum and dried air from the second airflow loop in proportions controlled by the valve means.

In one embodiment of the invention a supply section of the first airflow loop includes air blower means for providing a desired airflow rate to the container and heating means for heating the air to a desired temperature for drying the particles in the container. The heating section of the first airflow loop communicates with a lower region of the container, while a return section thereof communicates with an upper region of the container for returning the moisture-laden air from the container to the plenum.

In another embodiment of the invention the supply section of the first airflow loop includes an inlet opening communicating with an upper region of the plenum, the blower means being so disposed proximate the inlet opening so as to push air through the first airflow loop to the container and to pull air through the second, desiccant drying loop.

In still another embodiment of the invention the valve means is movable in the plenum between an outlet section of the second, desiccant drying loop and the supply section of the first airflow loop. The valve means preferably comprises a tubular valve member having an internal passage communicating with the outlet section of the second, desiccant drying loop for supplying dried air from the desiccant drying loop to the supply section of the first airflow drying loop.

The apparatus of the invention is advantageous in that a high airflow is provided through the container for fast heating/drying of the particles while the desiccant dryer can be sized to the moisture removal capacity of the desiccant material so as to permit use of a smaller desiccant dryer unit and thereby provide a significant reduction in equipment cost.

DESCRIPTION OF THE DRAWING

The drawing is a schematic illustration of drying apparatus constructed in accordance with the invention.

DETAILED DESCRIPTION

The preferred embodiment of drying apparatus according to the invention comprises an upstanding container 10, such as a hopper, for holding plastic resin particles (not shown) to be dried. The container 10 includes a bottom discharge outlet 10a which is openable after drying of the resin particles to deliver them to an extruder (not shown) beneath the hopper.

A first airflow loop 12 communicates with the container 10 for passing a heated stream A1 of air therethrough for heating the resin particles and removing moisture therefrom. The first airflow loop 12 includes a supply section 14 for supplying heated air to the container 10 and a return section 16 for receiving a stream A2 of moisture-laden return air from the container.

The supply section 14 includes an inlet opening 30 communicating with the upper region of a plenum 40. A motor-driven blower 20 is disposed at the inlet opening 30 to push the airstream A1 through the first airflow loop 12 and through the container 10 at selected flow rate. The first airflow loop 12 thus is considered to be a closed, positive pressure loop. At the same time, the blower 20 also pulls air through a second, desiccant drying loop 22 to be described below, which is considered to be a closed, negative pressure loop. An electrical resistance or other suitable heating device 22 is disposed in the supply section 14 downstream of the blower 20 for raising the temperature of the airstream A1 to a selected level, such as between 160° and 300° F., before it enters the container 10.

The supply section 14 of the first airflow loop 12 communicates with a lower region of the container 10 through a conventional apertured airflow dispersal device 28 through which the heated airstream A1 is supplied to and dispersed in the container 10.

The return section 16 of the first airflow loop 12 communicates with an upper region of the container 10 for receiving the moisture-laden return airstream A2 exhausted from the container after passing around the plastic resin particles therein. The return section 16 delivers the moisture-laden return air A2 to the plenum 40.

The plenum 40 is disposed between the supply section 14 and the return section 16 of the first loop 12 and in communication therewith. The plenum 40 is defined by a housing 42 in which suitable air filters 44 are disposed for removing particulate material from the moisture-laden return air A2.

The second, closed desiccant drying loop 22 includes an inlet section 34 in communication with an upper region of the plenum 40 for receiving a portion or substream A3 of the moisture-laden airstream A2 returned to the plenum 40 and a desiccant dryer 35 for removing moisture from the moisture-laden substream A3 to dry it and thereby form a dried airstream A4. The desiccant dryer 35 communicates with the first airflow loop 12 via the inlet opening 30 thereof and an outlet section 38 of the second airflow loop that is located proximate the inlet opening 30.

The desiccant dryer 35 preferably comprises a porous rotary wheel 36a having known desiccant material (not shown) thereon for removing moisture from the moisture-laden airstream A3. A rotary wheel desiccant dryer useful in practicing the invention is available from HydReclaim Corporation, Fenton, Mich. under the designation HydraDry Honeycombe ® wheel dryer. A desiccant dryer 36 of this type includes a first drying compartment 36b where moisture is removed from the stream A3 and a second regeneration compartment 36c where the desiccant material on the wheel 36a is regenerated by passing a heated airstream A5 across the material as is well known.

A tubular by-pass valve member 60 is disposed in the plenum 40 and is movable relative to the inlet opening 30 of the first airflow loop 12 for controlling the volume of the moisture-laden airstream A2 that enters the inlet opening 30 from the plenum and the volume of the airstream A3 that enters the inlet portion 34 of the desiccant drying loop 22 to be dried by the desiccant dryer 35 and returned to the inlet opening 30 as the dried airstream A4. The valve member 60 includes an internal passage 60a that communicates with the outlet section 38 of the desiccant drying loop 22 and a chamfered end 60b proximate the inlet opening 30 to cooperate therewith in controlling the relative proportions of the airstreams A2/A3 over a desired range of values.

The valve member 60 is adjustably mounted in a sleeve 62 fixed on the plenum housing 42 for linear sliding movement relative to the inlet opening 30. The valve member 60 can be moved in the sleeve 62 manually or by a suitable actuator (not shown) to control the relative proportions of the airstreams A2/A3.

In a typical method of operation of the invention the valve member 60 is adjusted relative to the inlet opening 30 to provide a substream A3 of the moisture-laden return airstream A2 to the desiccant drying loop 22 that ranges from 25% to 75% of the volume of the airstream A1 that flows through the container 10. The balance of the airstream A2 returned to plenum 40 is delivered to the inlet opening 30 of the first airflow loop 12. For example, a 300 pound per hour dryer apparatus of the invention will circulate 300 cubic feet per minute of airstream A1 through the first loop 12 and the container 10. The second, desiccant drying loop 22 will circulate 150 cubic feet per minute of airstream A3 continually to remove the moisture therefrom for supplying the dried airstream A4 to the inlet opening 30 for mixing with the moisture-laden return airstream A2 from the plenum 40.

The desiccant drying loop 22 receives a selected airstream volume A3 of the moisture-laden return airstream A2 as controlled by the by-pass valve member 60 to remove moisture therefrom and return the dried airstream A4 to the inlet opening 30 for mixing with the moisture-laden airstream A2 from the plenum 40. The mixed airstreams A2/A4 constitute the airstream A1 that is heated and passed through the container 10 for heating/drying the resin particles therein.

The valve member 60 can be moved to an extreme left-hand position from the position shown in the drawing with its end 60b accommodated in the inlet opening 30 of the first airflow loop 12. When the valve is in this position, only the dried airstream A4 from the desiccant drying loop 22 is supplied to the first airflow loop 12. As a result, the apparatus operates as a closed loop desiccant dryer. This mode of operation may be useful in drying plastic resin particles such as nylon and ABS which are difficult to dry to the very low dryness levels required for extrusion.

Alternately, the valve member 60 can be moved from the position shown in the drawing to an extreme right-hand position proximate the outlet portion 38 of the desiccant drying loop 22 and remote from the inlet opening 30 so that the moisture-laden return airstream A2 in the plenum 40 by-passes the desiccant drying loop 22. This mode of operation of the apparatus is useful for preheating the resin particles in the container 10 when drying thereof is not required.

The apparatus of the invention is advantageous in that a high volume airstream A1 is provided through the container 10 for fast heating/drying of the resin particles while the desiccant dryer 35 can be sized to the moisture removal capacity of the desiccant material so as to permit use of a smaller desiccant dryer and thereby provide a significant reduction in equipment cost.

While the invention has been described in terms of specific preferred embodiments thereof, it is not intended to be limited thereto but rather only to the extent set forth in the claims.

I claim:

1. Apparatus for drying moisture-bearing particles comprising:
   a. a container for holding the particles to be dried,
   b. a first airflow loop communicating with the container for passing a heated airstream therethrough for heating the particles and removing moisture therefrom as a moisture-laden return airstream,
   c. a plenum in communication with the first airflow loop for receiving the return airstreams,
   d. a second airflow loop communicating with the plenum for receiving at least a portion of the moisture-laden airstream returned to the plenum, said second airflow loop having dryer means in communication with the first airflow loop for drying said portion of the return airstream and supplying said portion as dried air to said first airflow loop, and
   e. valve means in the plenum for controlling the volume of the return airstream that is supplied to the first airflow loop from the plenum and that is supplied to the first airflow loop via the second airflow loop after drying by said drying means.

2. The apparatus of claim 1 wherein the first airflow loop includes a supply section communicating with a lower region of the container and a return section communicating with an upper portion of the container.

3. The apparatus of claim 1 wherein the first airflow loop includes a supply section having an inlet opening communicating with an upper region of the plenum.

4. The apparatus of claim 3 including air blower means disposed proximate the inlet opening.

5. The apparatus of claim 4 including heating means disposed downstream of the blower means in the supply section.

6. The apparatus of claim 4 wherein the blower means pushes air through the first airflow loop and pulls air through the second airflow loop.

7. The apparatus of claim 3 wherein the second airflow loop includes an outlet section communicating with an upper region of the plenum.

8. The apparatus of claim 7 wherein the outlet section is disposed proximate the inlet opening of the first airflow loop.

9. The apparatus of claim 1 wherein said dryer means comprises a desiccant dryer.

10. The apparatus of claim 9 wherein said desiccant dryer is rotary.

11. The apparatus of claim 1 wherein the valve means is movable in the plenum between an outlet section of the second airflow loop and a supply section of the first airflow loop.

12. The apparatus of claim 1 wherein the valve means comprises a tubular valve member having an internal passage communicating with an outlet section of the second airflow loop for supplying dried air to a supply section of the first airflow loop.

13. The apparatus of claim 12 wherein the valve member is movable in the supply section of the first airflow to a position in which only dried air from the second airflow loop is supplied to the supply section of the first airflow loop.

14. The apparatus of claim 12 wherein the valve member is movable to a position in which only moisture-laden return air from the plenum is supplied to the supply section of the first airflow loop.

15. A method of drying moisture-bearing particles comprising:
   a. supplying a heated airstream to a container holding the particles to remove moisture from the particles and entrain removed moisture in a moist airstream,
   b. conveying the moist airstream from the container to a plenum,
   c. conducting a portion of the moist airstream from the plenum through a dryer to remove moisture from said moist airstream and provide a dried airstream,
   d. mixing the dried airstream from the dryer with another portion of the moist airstream from the plenum to provide a mixed airstream,
   e. heating the mixed airstream, and
   f. returning said heated mixed airstream to said container.

16. The method of claim 15 including varying the portion of the return airstream conducted to the dryer.

17. The method of claim 15 including supplying the heated airstream to the container and returning the moist airstream from the container to the plenum via a closed first airflow loop between the container and the plenum.

18. The method of claim 17 including conducting said portion of the return airstream through the dryer via a second closed airflow loop between the plenum and the first airflow loop.

19. The method of claim 18 including conveying the dried airstream from the dryer through the second airflow loop to the first airflow loop for mixing with the moist airstream from the plenum.

20. The method of claim 19 including pushing the heated airflow through the first airflow loop and pulling said portion of the return airflow through the second airflow loop.

* * * * *